July 12, 1938.  R. E. MAYO ET AL  2,123,433
ENGINE
Filed Dec. 9, 1933  3 Sheets-Sheet 1
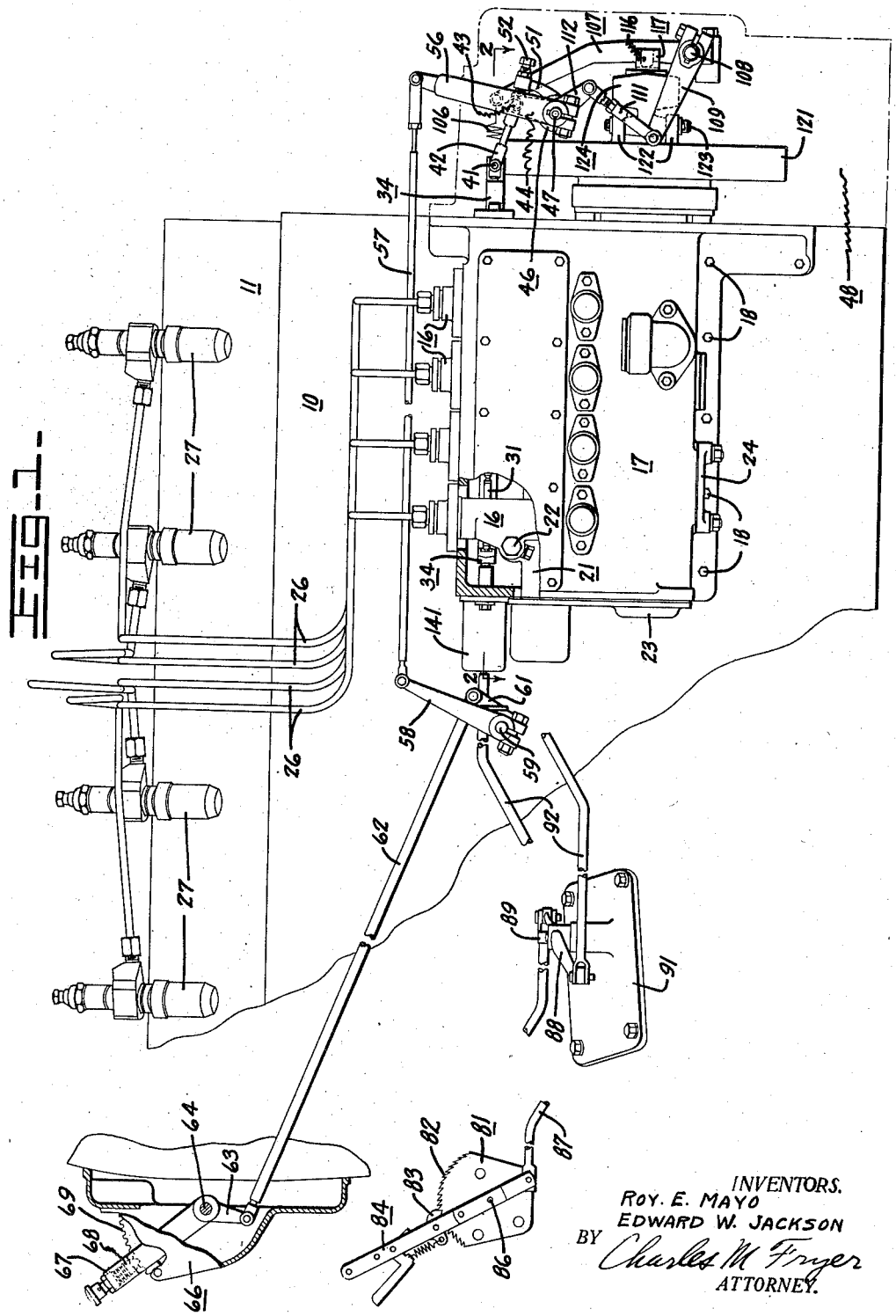
INVENTORS.
ROY. E. MAYO
EDWARD W. JACKSON
BY Charles M Finger
ATTORNEY.

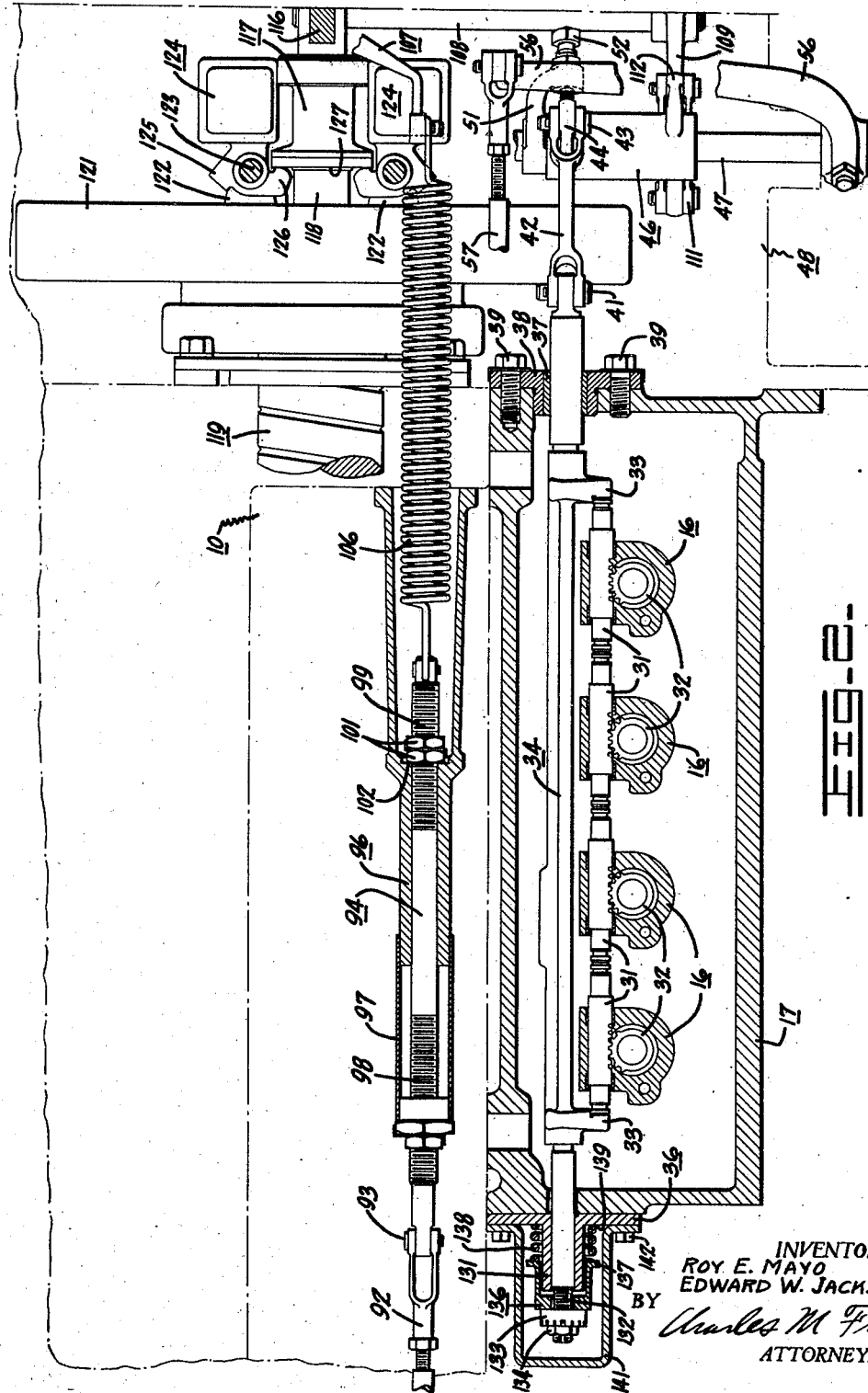

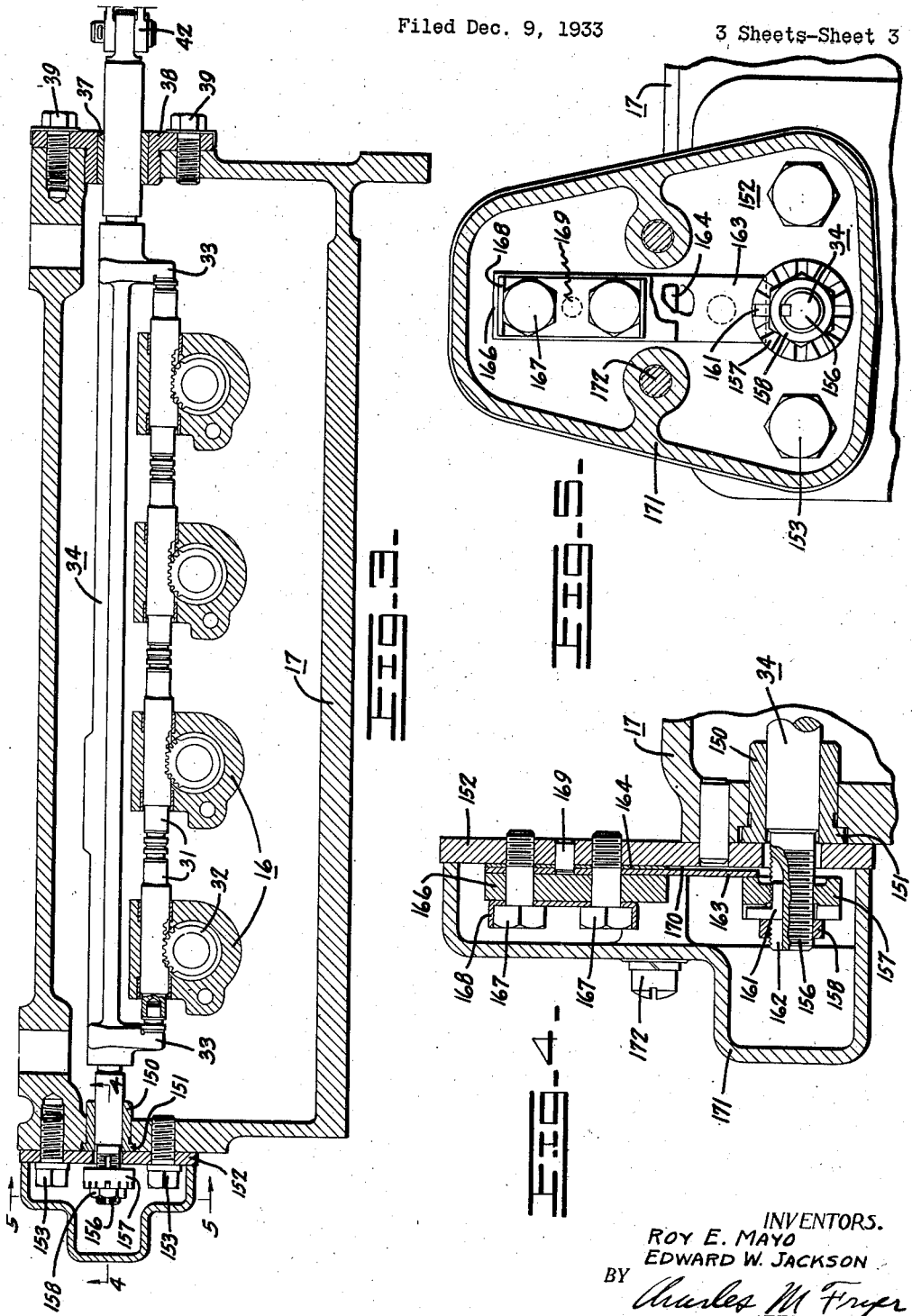

Patented July 12, 1938

2,123,433

UNITED STATES PATENT OFFICE 2,123,433

ENGINE

Roy E. Mayo, San Leandro, Calif., and Edward W. Jackson, Peoria, Ill., assignors to Caterpillar Tractor Co., San Leandro, Calif., a corporation of California Application December 9, 1933, Serial No. 701,580

9 Claims. (Cl. 123—140)

The present invention relates to compression ignition and the like engines adapted for use as the power plant of a tractor, and more particularly to the provision of an improved mode of operation thereof. In tractor operation, one of the most important characteristics of an engine is its "lugging" ability, i. e., an automatic increase of torque with decrease in speed when, under full load operation, an increased load is placed on the engine. The importance of this characteristic is believed apparent when one considers the fact that it enables the carrying of increased load without stalling of the engine, whereas if such torque characteristics are not present, increased load, resulting in reduced engine speed, reduces the torque and the engine stalls.

It is an object of the invention, therefore, to provide a compression ignition and the like engine which is capable of producing increased torque when it is slowed down under an increased load during full load operation.

Another object of the invention is to provide a fuel injection system for compression ignition and the like engines having characteristics providing an increase in torque when the engine slows down under an increased load.

Another object of the invention is to provide control means for a compression ignition and the like engine which are operable to provide the desired torque characteristics in the engine.

Another object of the invention is to provide a fuel injection system for a compression ignition and the like engine including means for increasing the amount of fuel injected into the cylinders of the engine when the engine slows down under an increased load during full load operation.

Another object of the invention is to provide a fuel injection system for a compression ignition and the like engine, and control means therefor automatically operable to increase the amount of fuel injected into the cylinders of the engine when such increased fuel is required to supply increased torque.

Another object of the invention is to provide means for controlling the torque characteristics of a compression ignition and the like engine.

Other objects will appear as the description progresses.

Description of figures

Fig. 1 is a partial side elevation of a compression ignition and the like engine, illustrating the fuel injection system and the control means therefor.

Fig. 2 is an enlarged horizontal section taken on the line 2—2 in Fig. 1.

Figs. 3 through 5 illustrate a second form of the invention.

Fig. 3 is a horizontal section similar to Fig. 2.

Fig. 4 is a vertical longitudinal section taken on the line 4—4 in Fig. 3.

Fig. 5 is a vertical transverse section taken on the line 5—5 in Fig. 3.

Description of engine

The compression ignition and the like engine disclosed herein comprises block 10 having head 11 thereon, said block and said head being illustrated schematically in Fig. 1. For a complete disclosure of the specific construction of the block and cylinder head, reference is hereby made to the copending application of Carl G. A. Rosen, Serial No. 684,179, filed August 8, 1933. The fuel injection system is of the solid injection type, that is, a system in which air-free fuel is injected into the cylinders in the form of a finely divided spray, caused by forcing fuel at a high pressure through fuel injection nozzles. The combustion system is preferably of a precombustion chamber type, as fully disclosed in the above-noted application.

The fuel injection system includes a plurality of fuel injection pumps, one for each cylinder of the engine, to which fuel is supplied through a common manifold. Each pump is associated with a fuel injection nozzle having a single discharge orifice suitably disposed in the precombustion chamber of the associated cylinder.

A plurality of fuel injection pumps 16 (Fig. 1) are suitably mounted in housing 17 secured on engine block 10 by cap screws 18. Fuel manifold 21 is mounted in housing 17 to supply fuel to the pumps 16, and is secured to each pump 16 by fastening means 22. Fuel is supplied under pressure to fuel manifold 21 through a suitable filter and a fuel transfer pump (not shown), preferably mounted on housing 17. Covers 23 and 24 are shown over apertures in housing 17 in place of the fuel filter and the fuel transfer pump, respectively. From each fuel injection pump 16, a conduit 26 leads to the associated fuel injection nozzle 27, all conduits 26 having the same dimensions to obtain uniform fuel injection characteristics.

The fuel injection pumps 16 are the type adapted to force measured quantities of fuel through the associated conduits and fuel injection nozzles, and have control racks; the setting of the control rack of each pump determining the amount of fuel injected by the pump plunger which is reciprocated by suitable connections from a camshaft mounted in housing 17 and driven in a timed relation from the crankshaft of the engine. The control racks of all the fuel injection pumps are actuated simultaneously according to the throttle setting, and the action of the governing means in response to engine demand.

Each pump 16 (Figs. 1 and 2) has control rack 31 mounted therein, the toothed portion of each control rack engaging rotatable pump element 32, the rotated position of which determines the amount of fuel injected. As seen in Fig. 2, all racks 31 are disposed in end to end relation between ears 33 on throttle slide bar 34, so that movement of slide bar 34 simultaneously controls the various pumps to determine the amount of fuel injected. As viewed in Fig. 2, movement of bar 34 to the right increases the amount of fuel injected.

A pair of hand control levers are connected to the throttle slide bar 34 to control fuel injection. One of the control levers is for the purpose of allowing setting the pumps in proper position when it is desired to start the engine and for positively shutting off the pumps when it is intended to stop the engine. The other of the control levers is for regulating engine speed and is connected with the governor of the engine.

Throttle slide bar 34 (Fig. 2) is mounted for sliding movement at its left end in bracket 36 suitably secured to housing 17, and at its other end in bushing 37 and bracket 38 secured to housing 17 by cap screws 39. The right or front end of slide bar 34, as viewed in Figs. 1 and 2, is pivotally connected by pin 41 to link 42, having its other end pivotally connected by pin 43 to arm 44 extending upwardly from sleeve 46 pivotally mounted on shaft 47. Said shaft 47 is suitably supported in timing gear housing 48, shown in phantom lines. Keyed on shaft 47 for rotation therewith is arm 51 having adjusting screw 52 threaded in the upper end thereof, and freely abutting arm 44. Shaft 47 (Fig. 2) extends outside of timing gear housing 48, and has bent arm 56 keyed and clamped thereon (Figs. 1 and 2). Said arm 56 has adjustable rod 57 pivotally secured to the free end thereof, said rod extending rearwardly (Fig. 1) and having a pivotal connection with arm 58 keyed and clamped on shaft 59. Said shaft 59 is suitably supported on block 10, and has shorter arm 61 mounted thereon similarly to arm 58 and having its upper end pivotally connected to rod 62. Rod 62 has its rearward end pivotally connected to arm 63 of the engine starting control lever 67 which is pivotally mounted on shaft 64 in bracket 66. Control lever 67 has spring-pressed pin 68 adapted for engagement with arcuate rack 69 on bracket 66. Oscillation of lever 67 to the extreme right, as viewed in Fig. 1, through levers 63, 67 and the connecting lever system, serves to rock shaft 47 and arm 51 to thereby cause screw 52 to move arm 44 to the left and hence move throttle slide bar 34 to the left, as viewed in Fig. 2, to shut off positively the pumps. Movement of control lever 67 to the left position, as shown in Fig. 1, moves screw 52 to the right out of the way of arm 44 to allow operation of the pumps under control of both the governor and a manually adjustable engine speed throttle control linkage in a manner to be subsequently explained. As was previously explained, hand lever 67 is only operated in starting and stopping of the engine.

The governor is of any suitable construction and has resilient means adjusted by the setting of the throttle control linkage, and centrifugal means rotated by the engine to act in opposition to said resilient means. The resilient and centrifugal means are connected to the throttle slide bar 34 so that, according to the tension placed on the resilient means, the governor acts automatically to control the fuel injection pumps to supply fuel to the cylinders of the engine in response to engine demand. The throttle control linkage (Fig. 1) includes bracket 81 suitably mounted on the tractor and having rack 82 adapted for cooperation with pawl 83 on throttle control lever 84 which is the second of the levers previously mentioned. Control lever 84 is adjustable over a range to fix the engine speed from idling to full load, and is shown in Fig. 1 in its adjusted position determining full load operation of the engine, or in other words maximum engine speed, which is the speed at which a tractor is practically always operated for heavy duty work. Said lever 84 is pivoted on bracket 81 at 86, and has its lower end pivotally connected to link 87. Said link 87 has its front end pivotally connected to one arm of lever 88, pivoted at 89 on bracket 91, said bracket being suitably mounted on the tractor. The other arm of lever 88 is pivotally connected to adjustable rod 92 which extends forwardly, and is pivotally connected at 93 (Fig. 2) to adjustable connection 94 slidably mounted in bracket 96. Bracket 96 is mounted on block 10 exteriorly thereof, the control linkage extending through bracket 96 and block 10 to timing gear housing 48. Cylindrical shield 97 is adjustably mounted on threaded portion 98 of connection 94, and has telescopic engagement with bracket 96 to provide a seal between said bracket 96 and connection 94. Shield 97 thus serves to prevent the entry of deleterious matter into the engine.

Adjustable stop means is provided to determine the maximum normal adjustment of the resilient governor means by the throttle control lever 84. The forward end of connection 94 (Fig. 2) is threaded at 99, and has adjusting nuts 101 threaded thereon adapted to contact face 102 of bracket 96, to determine the full load position of the throttle control means. A governor spring 106 is tensioned between connection 94 and arm 107 (Figs. 1 and 2) keyed and clamped on shaft 108. Said shaft 108 is suitably mounted in timing gear housing 48, and has arm 109 keyed and clamped thereon. Arm 109 (Fig. 1) is pivotally connected to adjustable link 111 having its opposite end pivotally connected to arm 112 on sleeve 46. It will be recalled that sleeve 46 has upwardly extending arm 44 providing a connection to throttle slide bar 34.

From the foregoing description, it is seen that movement of throttle control lever 84 (Fig. 1) to the left places increasing tension on governor spring 106 which, through arm 107, shaft 108, arm 109, link 111, arm 112, and arm 44 tends to move throttle slide bar 34 to the right, i. e., in the direction to cause increased injection of fuel. During operation of the engine, such direction of movement and increasing tension on spring 106 are opposed by the centrifugal action of the governor fly balls as a result of increased engine speed caused by increased fuel injection.

Arm 107 (Fig. 1) is urged in counter-clockwise direction in response to increase of tension on spring 106 upon manual adjustment of the throttle control linkage to cause increased injection of fuel, and as previously explained, such movement of arm 107 is opposed by the governor fly balls. For this purpose, arm 107 has integral lug 116 (Figs. 1 and 2) abutting an end of sleeve 117 slidably mounted on extension 118 of camshaft 119. Camshaft 119 is driven from the crankshaft through gear 121 having opposite pairs of projecting ears 122 providing a pivotal mounting by means of pins 123 for governor fly balls 124. Fly balls 124 have stop projections 125 adapted to engage gear 121 to limit outward movement of said balls, and inwardly projecting ears 126 engaging annular face 127 of sleeve 117 to impart movement thereto in accordance with movement of said fly balls 124.

As seen in Fig. 2, rotation of gear 121 and camshaft 119 causes fly balls 124 to move outwardly whereby through ears 126 on said fly balls 124 sleeve 117 is moved to the right. Such movement of sleeve 117 causes oscillation of arm 107 in a clockwise direction, as viewed in Fig. 1, opposing the force exerted thereon by spring 106. For any given setting of the throttle control lever 84 and the corresponding tension placed on governor spring 106, the centrifugal action of governor fly balls 124 produces a state of equilibrium in the throttle control linkage for the fuel pumps as long as the engine operates at a constant speed. As the speed of the engine increases or decreases in response to varying loads thereon, the centrifugal action of governor fly balls 124 in opposition to spring 106 causes corresponding oscillation of arm 107 to control movement of throttle slide bar 34; counter-clockwise oscillation of said arm 107 increasing the fuel supply and clockwise oscillation thereof having the opposite effect. Thus, the engine speed is maintained substantially constant for any given load up to the normal or rated full load, and, hence, at normal or rated full load full speed operation of the engine, spring 106 is under such tension as to just counterbalance the action of governor flyballs or elements 124 to maintain the speed of the engine substantially constant if the engine is operating normally with no material overload imposed thereon.

Means are provided for allowing automatic adjustment of the throttle slide bar to cause an increase of injection of fuel into the cylinders of the engine when, under full load setting of the throttle control linkage, the speed of the engine decreases in response to increase of load or overload on the engine. As the amount of fuel injected is one of the principal factors controlling the torque developed by the engine, an increase in the amount of injected fuel determines an increase in torque which is extremely desirable for lugging ability under full load of the engine. The left end of throttle slide bar 34 extends through boss 131 of bracket 36, and is threaded at 132 to receive castle nut 133 and lock nut 134, a suitable key preventing rotation of nut 133 on bar 34. Cup-shaped member 136 is apertured to receive threaded portion 132 and overlaps the end of boss 131 terminating in flange 137. A precalibrated compression spring 138 (Fig. 2) is disposed between flange 137 and face 139 of bracket 36 and serves as a torque control spring. Cover 141 encloses the torque control assembly, being secured, with bracket 36, to housing 17 by cap screws 142.

The precalibrated tension of compression spring 138 is such that during normal operation of the engine with throttle slide bar 34 set at full load position by means of lever 84, said spring serves merely as a resilient stop; the tension of spring 106 being counteracted by the centrifugal action of governor fly balls 124. However, when the speed of the engine decreases, because of overload on the engine, governor fly balls 124 move inwardly and the centrifugal action thereof is no longer sufficient to overcome the tension of spring 106, which as a result acts to oscillate arm 107 in a counter-clockwise direction thus moving throttle slide bar 34 to the right against the compression of spring 138. The extent of movement permitted is determined by the engagement of cup-shaped member 136 with the end of boss 131. Thus, it is seen that, when the speed of the engine decreases under full load operation, an increased extent of movement is provided for throttle slide bar 34 to increase the amount of fuel injected into the cylinders of the engine, such increased amount serving to give the increased torque required to carry the overload placed on the engine. Spring 138, therefore, acts to allow for additional movement of the slide bar 34 for engine overload, but for normal full load of the engine it merely serves as a stop.

In a compression ignition engine, the normal or rated full load full speed operation of the engine is usually fixed slightly below the maximum capacity of the engine so as to prevent injury to the engine by continuous overwork in the field. This is usually accomplished at the factory. In the present arrangement, such rated or normal full load operation is determined by the preadjustment of nut 133 in co-operation with the preadjustment of nuts 101, to fix the normal maximum fuel injection position of control member 34 which position is not such as to set the pumps at ultimate maximum pumping capacity. Consequently, the pumps have the ability to supply more fuel if permitted to do so.

If a non-yielding or fixed stop were employed instead of torque control spring 138, to provide the abutment for the normal or rated full load full speed setting of throttle slide bar 34, as was employed prior to this invention, then it is apparent that if the engine became temporarily overloaded, further movement of slide bar 34 to the right, in Fig. 2, could not occur and consequently no greater quantity of fuel could be injected or supplied to the engine than that supplied at rated full load. To the contrary, a lesser quantity of fuel would be injected under such circumstances because the speed of the engine would immediately decrease caused by the imposition of such overload, and this would directly cause less fuel to be injected which in turn would result in further decreasing the speed of the engine; and unless the load were immediately relieved the engine would die down to a stop. The decrease in injection of fuel under such conditions would not only occur directly from decrease of engine speed but also because of the peculiarities of a solid fuel injection system for a compression ignition engine. In such system, there is always a certain amount of fuel leakage in the pumps, and for any given setting of the fuel pumps, such leakage will increase upon decreasing speed of operation thereof resulting from decrease in engine speed, inasmuch as there is then more time for the leakage to occur. The greater fuel leakage obviously reduces the quantity of fuel injection. Also, it appears that the hydraulic or pressure characteristics of a solid fuel injection system are such that for any given setting of the pumps, decrease in fuel injection will result upon decrease in the speed of operation of the pumps.

Dying of the engine under the conditions noted is particularly objectionable in tractor operation. When doing work, a tractor engine generally operates at its rated or normal full load full speed. Consequently, it is apparent that in doing such work, the engine would have no lugging ability to overcome temporary overloads, and would soon stall upon imposition of overload on the engine, which might, for example, be caused by the tractor encountering a slight grade in the progress of its travel while pulling a full load. This is obviously undesirable.

However, with the device of the present invention, when overloading of the engine causes reduction in speed thereof, with consequent collapsing of governor flyballs 124, the torque control spring 138 then permits governor spring 106 which acts in opposition thereto, to move throttle slide bar to cause more fuel to be injected by the pumps; and the spring can be so calibrated as to actually allow more fuel to be injected into the engine within a predetermined speed range below the normal or rated full load full speed operation of the engine, than is injected at full speed under normal load. Such increased amount of fuel, thus, provides increased engine torque to prevent the engine from ultimately stalling and to impart great lugging ability thereto for overcoming temporary overloads imposed thereon.

Figs. 3 through 5 illustrate a second form of resilient or yieldable means for providing increased injection of fuel automatically in response to overload of the engine when set for full load operation. Only such portions of the structure will be described as are different from that disclosed above. Throttle slide bar 34 (Figs. 3 and 4) is slidably mounted at its left end in sleeve 150 having flange 151 held between housing 17 and plate 152 secured to said housing by cap screws 153. Said end of slide bar 34 is threaded at 156 to receive castle nut 157 and lock nut 158, similar to nuts 133, 134 in Fig. 2. Castle nut 157 (Fig. 4) is keyed on threaded portion 156 by L-shaped key 161 having one end disposed in slot 162 in threaded portion 156, and the other in a slot in castle nut 157. Leaf spring 163 (Figs. 4 and 5) is secured between plate 164 and block 166 to plate 152 by cap screws 167 having spring lock 168. Dowel 169 mounted in plate 152 and engaging apertures in plate 164 and spring 163 determines accurate positioning of said plate 164 and spring 163 with respect to each other, and with respect to throttle slide bar 34. Leaf spring 163 extends downwardly from block 166 and plate 164 having its lower end in the path of castle nut 157. Said castle nut 157 is positioned on throttle slide bar 34 to contact spring 163 when said bar 34 is adjusted to determine full load operation. Plate 164 spaces spring 163 from face 170 of the plate 152, forming a stop, to provide limited movement of throttle slide bar 34, in response to the tension of the governor spring as the centrifugal force of the fly balls decreases. The entire assembly of the torque control spring and the opening of the throttle slide bar is enclosed by a cover 171 secured to plate 152 by cap screws 172. In the example shown, the thickness of plate 164 provides for .034 inch of movement of the end of spring 163 and throttle slide bar 34, such movement providing for increased fuel injection and increased torque as the engine is reduced in speed from approximately 850 R. P. M. to 600 R. P. M. The rate of increase in fuel injection with respect to decrease in speed, and the range of decrease in speed during increased fuel injection are controlled accurately by preselecting the dimensions and characteristics of the leaf spring, which is easier to do than is the case with respect to a compression spring for the same purpose. Hence, the modification of Figs. 3 through 5 is preferred.

Thus it is seen that we have provided an improved method of operating compression ignition and the like engines to obtain the desired torque characteristics, together with novel means for carrying the method into effect. While the invention is adapted particularly to engines forming the power plants of tractors, obviously it can also be employed to obtain "lugging" ability in engines adapted for other uses.

We, therefore, claim as our invention:

1. In a compression ignition and the like engine, a plurality of fuel injection pumps adapted to eject measured amounts of fuel therefrom, common means connected to said pumps for controlling the amount of fuel ejected therefrom, resilient stop means determining the position of said common control means to cause injection of fuel for full load operation of said engine, and means responsive to a decrease in speed of said engine for moving said common control means against the resistance of said resilient stop means to thereby cause increased fuel injection and engine torque.

2. In a compression ignition and the like engine, a plurality of fuel injection pumps adapted to eject measured amounts of fuel therefrom, common means connected to said pumps for controlling the amount of fuel ejected therefrom, a settable member for adjusting said control means to a given position determining normal operation of said engine under a given load, yieldable stop means for allowing limited movement of said common control means beyond the adjusted position thereof determining injection of fuel for said given load operation of said engine, and means responsive to a decrease in speed of said engine for moving said common control means against the resistance of said yieldable stop means to thereby cause increased fuel injection and engine torque.

3. The combination with the fuel injection system of a compression ignition and the like engine, of means for controlling injection of fuel by said system into the cylinders of the engine, comprising movable means for controlling fuel injection, governing means settable to control movement of said movable means to determine operation of said engine at a selected speed, and yieldable stop means for allowing limited movement of said movable means beyond the position for normal full load operating speed of the engine, said governing means including mechanism operable in response to decrease of said full load engine speed caused by increased load on the engine to move said movable means against said yieldable stop means for increasing the amount of fuel injected and consequently the engine torque.

4. The combination with a compression ignition and the like engine having fuel injection means, a movable member for controlling said fuel injection means, and governing means for maintaining said movable member in a relatively fixed position for any selected speed of said engine up to normal full load, of a resilient stop cooperating with said movable member to allow limited movement of said member beyond the position for said normal full load operation of said engine, and means for automatically moving said member against said stop to effect increase of fuel supply for an overload to thereby impart increased torque and lugging ability to said engine.

5. In a governor system for a compression ignition and the like engine, governor means influenced by the speed of the engine for automatically controlling movement of movable fuel control mechanism which regulates the quantity of fuel supplied to said engine, and mechanism to provide for controlled automatic increase of fuel supply to said engine and consequent increase of engine torque upon decrease in engine speed caused by overloading of said engine while operating at substantially rated full load comprising yieldable means for allowing limited movement of said fuel control mechanism beyond a position thereof determining said rated full load operation of said engine.

6. In a governor system for a compression ignition and the like engine, having governor means influenced by the speed of the engine for automatically controlling movement of movable fuel control mechanism which regulates the quantity of fuel supplied to said engine; mechanism to provide for controlled automatic increase of fuel supply to said engine and consequent increase of engine torque upon decrease in engine speed caused by overloading of said engine while operating at substantially rated full load comprising resilient means cooperating with said fuel control mechanism to provide a yieldable stop allowing limited movement of said fuel control mechanism beyond a position thereof determining said rated full load operation of said engine.

7. In a governor system for a compression ignition and the like engine, having governor means influenced by the speed of the engine for automatically controlling movement of a movable fuel control member which regulates the quantity of fuel supplied to said engine; mechanism to provide for controlled automatic increase of fuel supply to said engine and consequent increase of engine torque upon decrease in engine speed caused by overloading of said engine while operating at substantially rated full load comprising a leaf spring cooperating with said control member to provide a yieldable stop allowing limited movement of said control member beyond a position thereof determining said rated full load operation of said engine.

8. In a governor system for automatically controlling fuel supply means in a compression ignition and the like engine; movable control mechanism connected to said fuel supply means to regulate the quantity of fuel supplied thereby; governor mechanism for maintaining the quantity of the fuel supplied and consequently the engine speed substantially constant for the position of said control mechanism determining operation of said engine at substantially rated full load operating speed including elements centrifugally operated by said engine and cooperating with said control mechanism to urge said control mechanism in a direction for decreasing the fuel supply upon increase of engine speed, and resilient means acting in opposition to said centrifugally operated elements and cooperating with said control mechanism to urge said control mechanism in a direction for increasing the fuel supply; and means providing a yieldable stop for said control mechanism in said position thereof determining said rated full load operation of said engine to allow limited movement of said control mechanism by said resilient means upon decrease in engine speed caused by overloading of said engine while operating at said rated full load to thereby increase the fuel supply and consequently the engine torque.

9. In a governor system for automatically controlling fuel supply means in a compression ignition and the like engine; movable control mechanism connected to said fuel supply means to regulate the quantity of fuel supplied thereby; governor mechanism for maintaining the quantity of the fuel supplied and consequently the engine speed substantially constant for the position of said control mechanism determining operation of said engine at substantially rated full load operating speed including elements centrifugally operated by said engine and cooperating with said control mechanism to urge said control mechanism in a direction for decreasing the fuel supply upon increase of engine speed, and resilient means acting in opposition to said centrifugally operated elements and cooperating with said control mechanism to urge said control mechanism in a direction for increasing the fuel supply; and second resilient means engageable with said control mechanism in said position thereof determining said rated full load operation of said engine to provide a yieldable stop to allow limited movement of said control mechanism by said first mentioned resilient means upon decrease in engine speed caused by overloading of said engine while operating at said rated full load to thereby increase the fuel supply and consequently the engine torque.

ROY E. MAYO.
EDWARD W. JACKSON.